No. 619,561.  Patented Feb. 14, 1899.
F. E. GARNER.
WHEEL HUB AND AXLE CONNECTION.
(Application filed Jan. 20, 1898.)
(No Model.)  2 Sheets—Sheet 1.

Witnesses:
J. D. Garfield
H. J. Clemons

Inventor,
Frank E. Garner,
by Chapin & Co.
Attorneys.

THE NORRIS PETERS CO., PHOTO-LITHO., WASHINGTON, D. C.

No. 619,561. Patented Feb. 14, 1899.
F. E. GARNER.
WHEEL HUB AND AXLE CONNECTION.
(Application filed Jan. 20, 1898.)
(No Model.) 2 Sheets—Sheet 2.
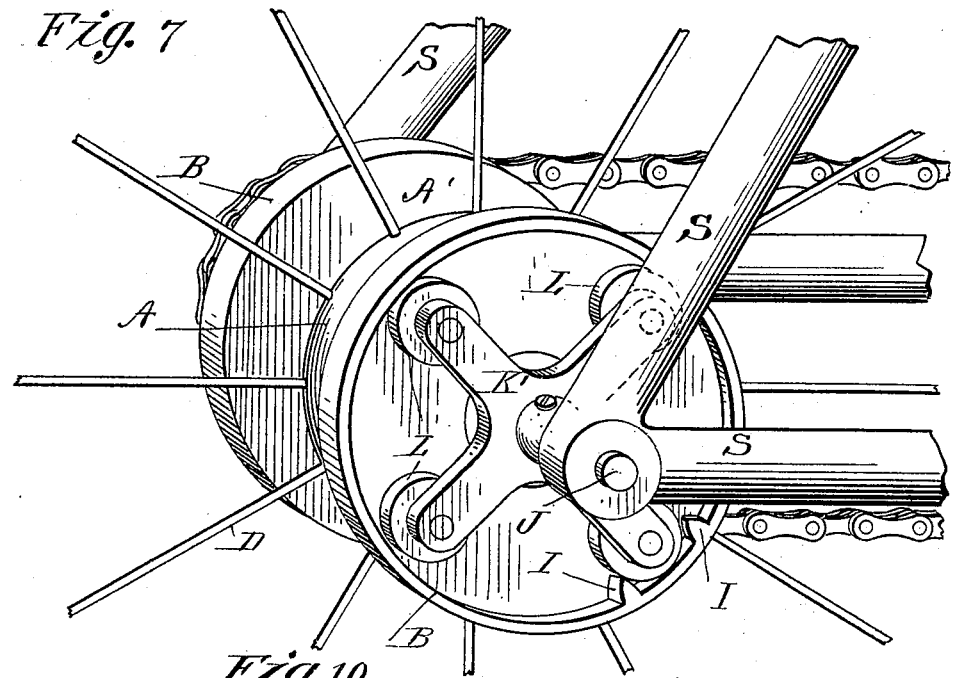
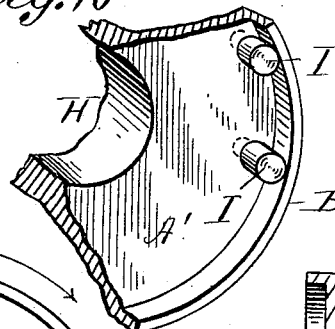
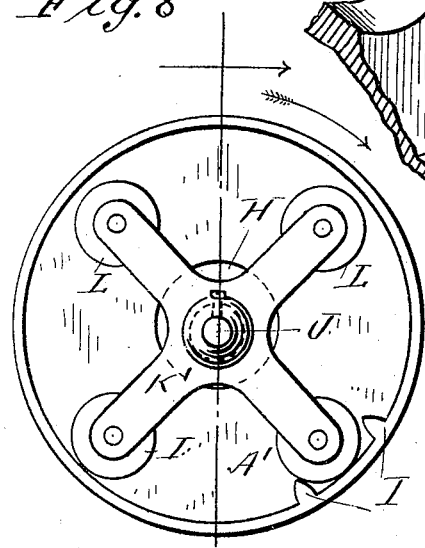
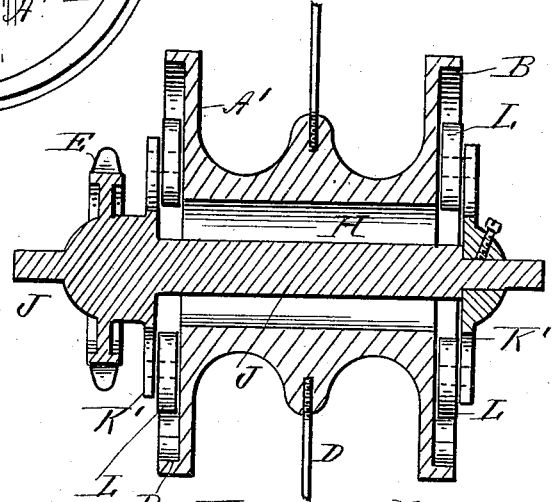
Witnesses:
Inventor,
Frank E. Garner,
by Chapin & Co.
Attorneys.

UNITED STATES PATENT OFFICE.

FRANK E. GARNER, OF LONG MEADOW, MASSACHUSETTS.

WHEEL-HUB AND AXLE CONNECTION.

SPECIFICATION forming part of Letters Patent No. 619,561, dated February 14, 1899.

Application filed January 20, 1898. Serial No. 667,217. (No model.)

*To all whom it may concern:*

Be it known that I, FRANK E. GARNER, a citizen of the United States of America, residing at Long Meadow, in the county of Hampden and State of Massachusetts, have invented new and useful Improvements in Wheel-Hub and Axle Connections, of which the following is a specification.

This invention relates to wheel-hub and axle connections for bicycles and analogous vehicles, the object being to provide in such and similar wheel constructions improved axle-supporting devices therefor, whereby the weight which the axle supports is made contributory to the rotary movement of the wheel with which such axle is connected; and the invention consists in the peculiar construction of the axle, the hub, and means on the latter for supporting said axle, all as hereinafter fully described, and more particularly pointed out in the claims.

Figure 1:
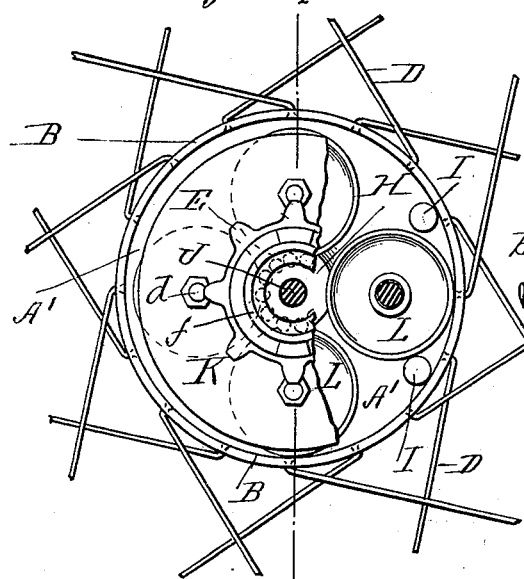
Figure 2:
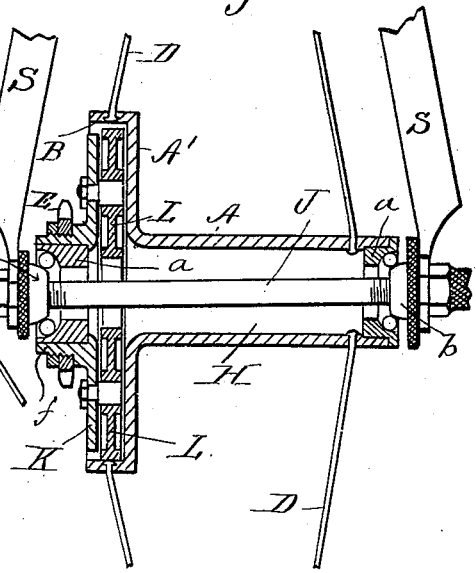
Figure 3:
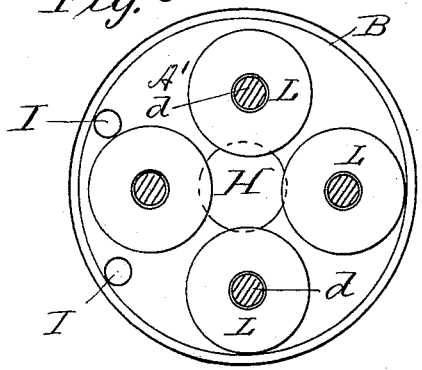
Figure 4:
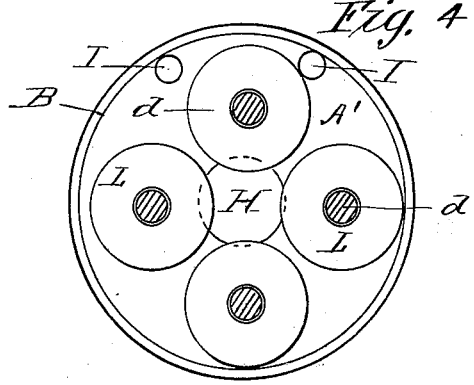
Figure 5:
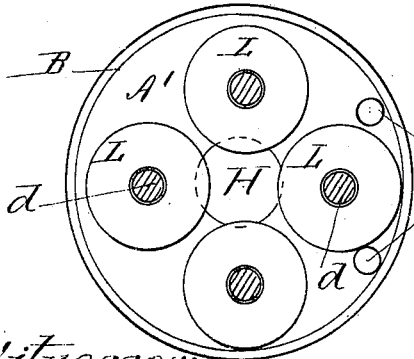
Figure 6:
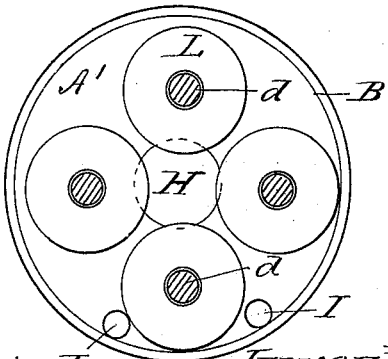

In the drawings forming part of this specification, Figure 1 is an end elevation of a bicycle-hub embodying my invention. Fig. 2 is a longitudinal section of the same on line 2 2, Fig. 1. Figs. 3, 4, 5, and 6 are diagrammatic views showing different positions occupied by parts of the construction during one revolution of the wheel. Fig. 7 is a perspective view of a modified construction of the hub shown in Fig. 1. Fig. 8 is an end elevation of the hub and axle and axle-supporting parts. Fig. 9 is a longitudinal section of the modified construction, taken on line 9 9, Fig. 8. Fig. 10 is a view of a part of one end of the hub.

In the drawings, S indicates parts of the rear portion of the frame of a bicycle, which for the purposes of illustration are shown in connection with the wheel and axle parts, hereinafter described, it being understood that the wheel and axle improvements of this invention are not necessarily confined to the use thereof on a bicycle.

A indicates the metal hub of the wheel, through which is arranged longitudinally and centrally an axle-passage H.

On one end of the hub A, as shown in Figs. 1 and 2, is arranged a circular path or runway B, consisting of a ring concentric with the axial line of said hub. On the flange A' of said runway B are outwardly-extending projections I, rigidly secured to said flange. In the drawings the said runway B is shown as supported on said hub integrally with the flange A' of the hub; but any other desired manner of supporting said runway may be adopted. The manner of connecting the spokes to the hub (said spokes being indicated by D) may be otherwise than that shown in the drawings, and any suitable rim may be applied to the spokes to complete the wheel. It should be noted that the axle-passage H is of greater diameter than the axle J, to the end that said axle may have a certain degree of free movement toward and from the inner wall of said axle-passage, or, in other words, within the hub. The axle on which said hub is supported is preferably fixed in the frame of the bicycle in the usual manner and ball-bearings of the usual type, consisting of a cup $a$ in the hub, a cone $b$ on the axle, and suitable balls, interposed between them. In one end of said hub (that opposite the sprocket end) the ball-cup is located in the end of the hub itself; but said sprocket end of the hub is supported primarily on a disk K, which carries on studs $d$ a series of rolls L, which bear on said runway and support one end of said hub, or in lieu of said disk the four-armed roll-carrier K' (shown in Fig. 7) may be employed; but the construction shown in Fig. 2 is the preferred one. Said disk K is provided with a hub $f$, on which the sprocket-wheel E is secured and in which is located the ball-cup in operative relation to the balls and cone for this end of said hub. Said rolls L are preferably four in number and are supported at equal distances apart and at equal distances from the center of the disk K for rotation on their studs $d$, fixed in said disk K, and are adapted to intermittently have contact with and by the action of the drive-chain and sprocket be rotated against the inner surface of said runway B at a point on said runway to one side of a perpendicular line let fall from the axis of the wheel. One of said rolls has an engagement with one of said projections I when the wheel is propelled forward and with the other of said projections when the wheel is propelled in the opposite direction by back-pedaling action. The greatest diameter from the outer edge of one of said rolls to the outer edge of the opposite roll is somewhat less than the internal diameter of the runway on which they bear, (this difference in diameter being much exaggerated in the drawings,) the passage H being of greater diameter than the axle J passing therethrough and the disk K being supported for rotation on the axle, which is rigidly secured in the frame. The rotary movements of said disk (one of the rolls of which is engaged by one of the projections I) results in the conversion of said rolls L into a series of levers, the fulcrum being the point of contact of the roll with the runway and the power being applied to the projections I, whereby the wheel-hub is rotated about the fixed axle, the end of the lever to which the power is applied being represented by the cranks of the bicycle operated by the rider, and the weight of the rider, which is supported entirely on the axle, will at all times hold said rolls L in contact with the lower portion of the runway, as indicated by the views from Figs. 3 to 6, inclusive. From another point of view the point of contact of the rolls L with one of the projections I may be considered as the fulcrum-point and the contact of the rolls with the runway the point at which the power is applied. In either case the application of rotary movements to the sprocket-wheel E causes the roll L in engagement with one of the projections I to act as a cam and force the hub of the wheel to the rear of the vertical center of the axle, if the wheel is moving forward, or in front of said vertical center if back-pedaling action is applied to said wheel, thus bringing such of the rolls L as bear on said runway into contact therewith at a point in advance of the said central vertical line of the axle, and as it is on these contacting rolls that the weight of the rider is carried the latter becomes a factor in imparting rotary movements to said wheel.

From this description it is seen that the hub of the wheel must of necessity run in a circle eccentric to the axis of the axle; but in practice the difference in diameter between the runway and the extreme diameter of the rolls L, as stated, is so small as not to make this eccentricity noticeable. The degree of said propelling force exerted upon the wheel through said runway engagement with said rolls L is proportionate to the distance from the axle to the contact-point of such engaging roll with said runway. This distance may be varied from that shown in the drawings, if desired. Said rolls L during the rotation of the wheel are each brought successively to the above-described position of leverage, whereby the wheel receives the added impetus of said load weight, as described.

The construction shown in Figs. 7 to 10, inclusive, illustrates a modification of the construction shown in the other figures of the drawings and represents a hub having a runway on each end thereof, the rolls L being supported on the four-armed carriers K', secured to the axle J, which is adapted to rotate in bearings on the frame. In Fig. 8 the projections I are shown integral with said runway; but the preferred construction is that shown in the other figures—viz., said projections consisting of studs fixed in the said hub in an operative position and projecting across the path of rotation of said rolls L.

Having thus described my invention, what I claim, and desire to secure by Letters Patent, is—

1. The combination with a wheel-hub having an axle-passage therethrough and having circular runways on each end thereof on which runways are projections extending toward the axis of the hub, of an axle extending through said hub of less diameter than said axle-passage, roller-carriers attached to said axle and friction-rollers intermediate of said carriers and runways and means for rotating said axle, the diameter of the circle described by said friction-rollers being less than the internal diameter of said runways substantially as set forth.

2. The combination with a wheel-hub having an axle-passage therethrough and having circular runways on each end thereof, presenting friction-roller-engaging faces in planes concentric with the axis of said hub, a series of projections extending from the said roller-engaging faces, an axle extending through said hub of less diameter than said axle-passage, roller-carriers attached to said axle, friction-rollers journaled to rotate on said carriers and for engagement intermittently with the face of said runway and with one or more of said projections, the diameter of the circle described by said friction-rollers being less than the internal diameter of said runways substantially as set forth.

3. The combination with a wheel-hub having an axle-passage therethrough, circular runways on each end thereof, an axle extending through said hub of less diameter than said passage, roller-carriers attached to said axle, rolls on said carriers intermediate of said axle and runways, the diameter of the circle described by said rolls being less than the internal diameter of said runways projections supported on said hub in the path of the line of movement of said rolls and engaged thereby, and means for rotating said axle, substantially as described.

4. The combination with a wheel-hub having an axle-passage therethrough, of a circular runway on one end of said hub, an axle extending through said hub and of smaller diameter than said passage, a series of rolls supported on said axle for successive engagement with said runway at one side of a vertical line let fall from the center of said hub, the diameter of the circle described by said rolls being less than the internal diameter of said runways a support for said rolls, a sprocket-wheel on said support, projections on said hub lying in the path of rotation of said rolls and constituting a driving connection between the support for said rolls, and said hub, substantially as described.

5. In a driving-wheel of a vehicle, the combination with the hub thereof having an axle-passage therethrough, an axle of smaller diameter than said passage and extending through said hub, a circular runway on said hub and concentric therewith, rolls for engaging with said runway, the diameter of the circle described by said rolls being less than the internal diameter of said runways a support for said rolls, means for rotating said support, projections on said hub for engaging one of said rolls, whereby by the rotation of said support in either direction, said hub is caused to rotate in a plane eccentric to the axis of said support for said rolls, substantially as described.

FRANK E. GARNER.

Witnesses:
WM. H. CHAPIN,
K. I. CLEMONS.